United States Patent
Walker

(10) Patent No.: US 8,791,713 B2
(45) Date of Patent: Jul. 29, 2014

(54) METHOD AND APPARATUS FOR BYPASSING SILICON BUGS

(75) Inventor: William L. Walker, Fort Collins, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 837 days.

(21) Appl. No.: 12/817,791

(22) Filed: Jun. 17, 2010

(65) Prior Publication Data
US 2011/0309855 A1 Dec. 22, 2011

(51) Int. Cl.
*G01R 31/26* (2014.01)

(52) U.S. Cl.
USPC .................................... 324/762.01

(58) Field of Classification Search
USPC ................ 324/762.01–762.1, 754.01–754.3, 324/763.01–763.02; 257/48; 438/14–18; 716/101–103, 106
See application file for complete search history.

(56) References Cited

U.S. PATENT DOCUMENTS

| 6,178,525 B1 * | 1/2001 | Warren | ............................ 714/37 |
| 2004/0181762 A1 * | 9/2004 | Carr | .................................. 716/4 |

* cited by examiner

*Primary Examiner* — Tung X Nguyen

(57) ABSTRACT

The present invention provides a method and apparatus for bypassing silicon bugs. One exemplary embodiment of the method includes using a logic element formed on a substrate to detect a predefined trigger condition indicating onset of a functional bug during operation of a semiconductor device formed on the substrate. The method also includes modifying operation of the semiconductor device to avoid onset of the functional bug by taking a predefined action associated with the predefined trigger condition.

20 Claims, 4 Drawing Sheets

METHOD AND APPARATUS FOR BYPASSING SILICON BUGS

BACKGROUND OF THE INVENTION

1. Field of the Invention

This invention relates generally to semiconductor fabrication, and, more particularly, to bypassing silicon bugs formed during semiconductor fabrication.

2. Description of the Related Art

Conventional devices formed on semiconductor chips, such as processors and memory elements, can include thousands or millions of interconnected transistors and other electronic elements. The operation of these individual components must be precisely coordinated so that the device can perform its desired function. However, despite the best efforts of the design engineers, initial circuit designs almost invariably include numerous "bugs," e.g., defects or errors in the design that cause the device to operate incorrectly, generate errors, lock up, or fail to operate at all. Almost by definition, the presence of bugs is impossible to detect in a device design and so an actual device must be fabricated and tested to find bugs. For example, engineers may use computer-aided design to generate a representation of a design for a cache memory and use this design to control fabrication of prototype devices. The design may (and in fact should) appear bug-free to design engineers prior to testing an actual device. Nevertheless, when the signals are applied to a cache memory formed on a chip using the design, the cache memory may malfunction. For example, the cache logic may become locked in a repetitive loop and perform the same operation over and over in response to particular combinations of events, such as a particular combination of cache hits and/or misses.

Engineers typically use an iterative process to identify and correct bugs in a design. The process begins by creating an initial design and using this design to form a device in silicon. The device is then subjected to a battery of tests that are intended to reveal any bugs in the design. If the test results reveal the presence of one or more bugs in the design, engineers attempt to identify the root causes of the bug(s) and modify the design to correct the bug. The modified design can then be used to form another device in silicon so that the new design and device can be tested to make sure that the previously identified bugs have been removed and no new bugs have been added. Each iteration of the testing process increases the design costs for the device and delays production of the device. The testing process would therefore ideally reveal all of the bugs in the device design during one iteration. However, this virtually never occurs in practice at least in part because the presence of one bug may obscure the presence of another bug until the first bug is corrected. For example, if events early in the testing process lead to a fatal error caused by a first bug, then the testing process will not be able to detect any bugs that may be triggered by subsequent events in the testing process. These bugs can only be detected after the first bug has been corrected so that the testing process can proceed to the subsequent events.

One approach to correcting bugs during design testing is to use focused ion beam processes to correct the bug or at least to prevent the bug from occurring during testing. For example, the focused ion beam can be used to modify the circuit on the chip to correct the bug or at least to re-wire the circuit so that the bug does not occur. This approach has the advantage of allowing testing to proceed past a particular bug so that additional bugs can be detected on the same physical device and therefore within the same iteration of the testing process. However, focused ion beam modifications are difficult, expensive, and require significant manual input from engineers. For example, an engineer may need to examine the actual chip with a scanning electron microscope to identify a particular wire that needs to be cut or to identify a location where a new wire should be fabricated. The engineer then needs to configure the focused ion beam device to perform the desired operation at the identified location. These techniques are too time intensive and labor intensive to be used during production runs and so they do not save silicon revisions.

Additional metal spins can be used to modify the metal layers in the device while leaving the base layers substantially intact. The metal spins can fix many bugs and allow validation of the design to continue. They can also be used to fix bugs in volume and so they can be used on production runs to produce chips that are shipped to customers, thereby reducing the time required to get the chips to production. However, a metal spin takes weeks to perform and costs hundreds of thousands of dollars. Metal spins are therefore not used between each iteration of the testing process.

SUMMARY OF EMBODIMENTS OF THE INVENTION

The disclosed subject matter is directed to addressing the effects of one or more of the problems set forth above. The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, a method is provided for bypassing silicon bugs. The method includes using a logic element formed on a substrate to detect a trigger condition indicating onset of a functional bug during operation of a semiconductor device formed on the substrate. The method also includes modifying operation of the semiconductor device to avoid onset of the functional bug by taking an action associated with the trigger condition.

In another embodiment, an apparatus is provided that includes a semiconductor device formed on a substrate. The apparatus also includes a logic element formed on the substrate. The logic element is configured to detect a trigger condition indicating onset of a functional bug during operation of the semiconductor device and modify operation of the semiconductor device to avoid onset of the functional bug by taking an action associated with the trigger condition.

In yet another embodiment, a method is provided for of debugging a semiconductor device formed on a substrate. The method includes supplying testing signals to the semiconductor device and using a logic element formed on the substrate to detect a trigger condition indicating onset of a functional bug using output signals generated by the semiconductor device in response to the testing signals. The method also includes modifying operation of the semiconductor device to avoid onset of the functional bug by taking an action associated with the trigger condition.

BRIEF DESCRIPTION OF THE DRAWINGS

The disclosed subject matter may be understood by reference to the following description taken in conjunction with the accompanying drawings, in which like reference numerals identify like elements, and in which.

Figure 1:
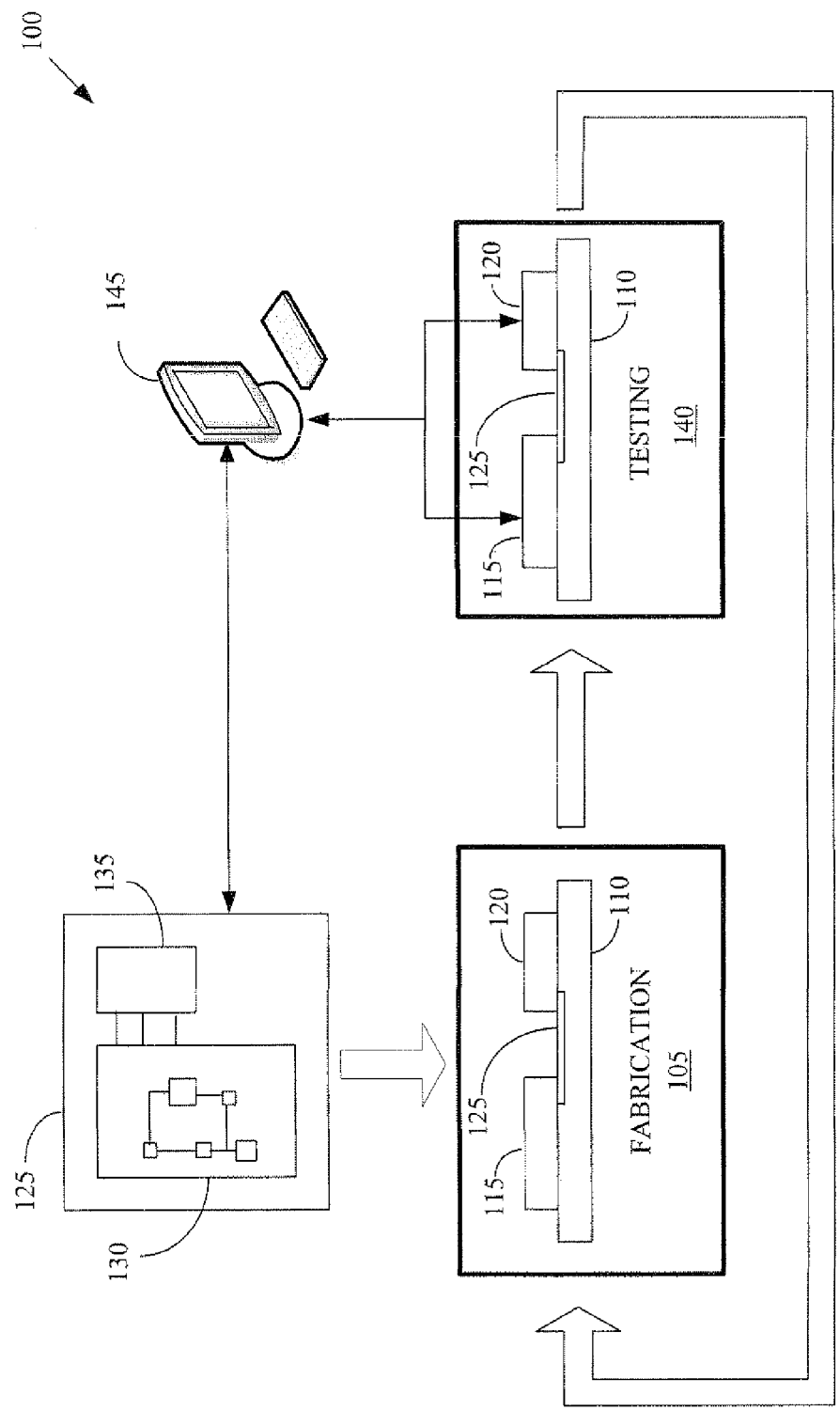
FIG. 1 conceptually illustrates one exemplary embodiment of a system that can be used to fabricate and test semiconductor devices.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 conceptually illustrates one exemplary embodiment of a system 100 that can be used to fabricate and test semiconductor devices. In the illustrated embodiment, the system 100 includes a fabrication portion 105 that is used to form various structures on one or more semiconductor wafers (or dies) such as a semiconductor wafer 110 depicted in FIG. 1. The fabrication portion 105 includes various tools that can be used to form structures on the semiconductor wafer 110. Exemplary tools include spin-on tools, deposition tools, growth tools, photolithography tools, etching tools, polishing or planarizing tools, ion implantation tools, and the like. Structures may be formed on the semiconductor wafer 110 using well known techniques. For example, transistors may be formed on the semiconductor wafer 110 using combinations of techniques including depositing/growing a layer of silicon, forming a mask over the layer using photolithography techniques, etching a silicon through the mask, filling etched portions of the silicon with semiconducting or conducting material, planarizing portions of the structure using chemical mechanical polishing, implanting ions into portions of the structure and activating the implanted ions using an anneal process.

In one exemplary embodiment, the fabrication portion 105 is used to form a semiconductor device 115 and a logic element 120 in or on the semiconductor wafer 110. The semiconductor device 115 and the logic element 120 may be communicatively and/or electronically coupled by one or more interconnects 125 that are formed in or on the semiconductor wafer 110. For example, the semiconductor device 115 may include a processing element, a main memory, and one or more cache elements. The logic element 120 may include a programmable logic analyzer that is used to detect onset of a functional bug during operation of the semiconductor device 115. The logic element 120 may then modify operation of the semiconductor device 115 to avoid or bypass onset of the functional bug by taking an action associated with the trigger condition, as will be discussed herein. In one embodiment, the semiconductor device 115, the logic element 120, and/or the interconnect(s) 125 can be formed concurrently, e.g., using the same tools and/or processes to form the structures that make up these elements.

The fabrication portion 105 uses a device design 125 to form the semiconductor device 115. In the illustrated embodiment, the device design 125 includes a portion 130 that defines the design parameters for the semiconductor device 115 and a portion 135 that defines the design parameters for the logic element 120. However, persons of ordinary skill in the art having benefit of the present disclosure should appreciate that the device design 125 may alternatively be used to define the design parameters for the semiconductor device 115 and a separate design may be used to define the design parameters for other elements that are formed on the semiconductor wafer 110, such as the logic element 120. The device design 125 may be created using well known techniques such as computer-aided design tools and may therefore be specified according to formats that are defined by these tools and/or the fabrication portion 105.

The system 100 also includes a testing portion 140 that can be used to perform tests to verify and/or validate the functionality of the semiconductor device 115. In the illustrated embodiment, the tests are defined and performed on the basis of signals provided to the testing portion 140 by a computer system 145. For example, engineers can define a test suite including various input signals that are provided to the semiconductor device 115 as indicated by the arrows. The semiconductor device 115 generates outputs in response to the test signals and sends the output signals back to the computer system 145. Operation of the semiconductor device 115 is verified and/or validated if the output signals match the signals expected by the computer system 145. However, silicon bugs in the semiconductor device 115 may cause the device 115 to operate incorrectly and return incorrect output signals or, in some cases, may cause fatal errors such as locking the semiconductor device 115 into an infinite loop or freezing operation of the semiconductor device 115. As used herein, the term "silicon bug" will be understood to mean bugs caused by the physical structure of the semiconductor device 115. Silicon bugs may be the result of an error in the design 130 or in the fabrication processes. Silicon bugs can be corrected by modifying the design and/or fabrication of the semiconductor device 115 to change the physical structure of the semiconductor device 115.

Output signals from the semiconductor device 115 and, in some cases, the input signals provided by the computer system 145 can be provided to the logic element 120. For example, the interconnect(s) 125 can be used to convey signals between the semiconductor device 115 and the logic element 120. The logic element 120 can then use these signals to detect onset of a silicon bug. For example, the logic element 120 may be programmed to recognize that a particular sequence of output signals (which may be formed in response to a particular set of input signals) precede onset of a silicon bug such as an infinite loop. The logic element 120 may therefore be programmed to modify operation of the semiconductor device 115 when it detects this particular sequence of output signals. For example, the logic element 120 may signal to the semiconductor device 115 to delay and/or override certain operations to avoid or bypass the silicon bug. Avoiding or bypassing the silicon bug in this manner may allow the testing procedure to continue to detect additional silicon bugs and/or to complete verification/validation of the semiconductor device 115.

When an iteration of the fabrication and testing process is complete, the semiconductor wafer 110 may be returned to the fabrication portion 105 for additional processing. In one exemplary embodiment of the present invention, the computer system 145 feeds back information including a list of the silicon bugs detected during the testing process. This information can be used to modify the design 130 for the semiconductor device 115 to correct the silicon bugs that were detected during testing procedure. The modifications may then be used to modify and/or rework the structures formed on the semiconductor wafer 110. For example, focused ion beam processes may be used to modify the semiconductor device 115 by removing metal and/or adding additional metal in appropriate locations. For another example, metal spins can be used to lay down different metal structures in accordance with the modified design 130. The modified design 130 may also be used to fabricate completely new semiconductor devices. For example, if the modifications to the design 130 lead to a silicon device that is substantially free of silicon bugs (or at least sufficiently free), the modified design 130 may be used for production runs.

Figure 2:
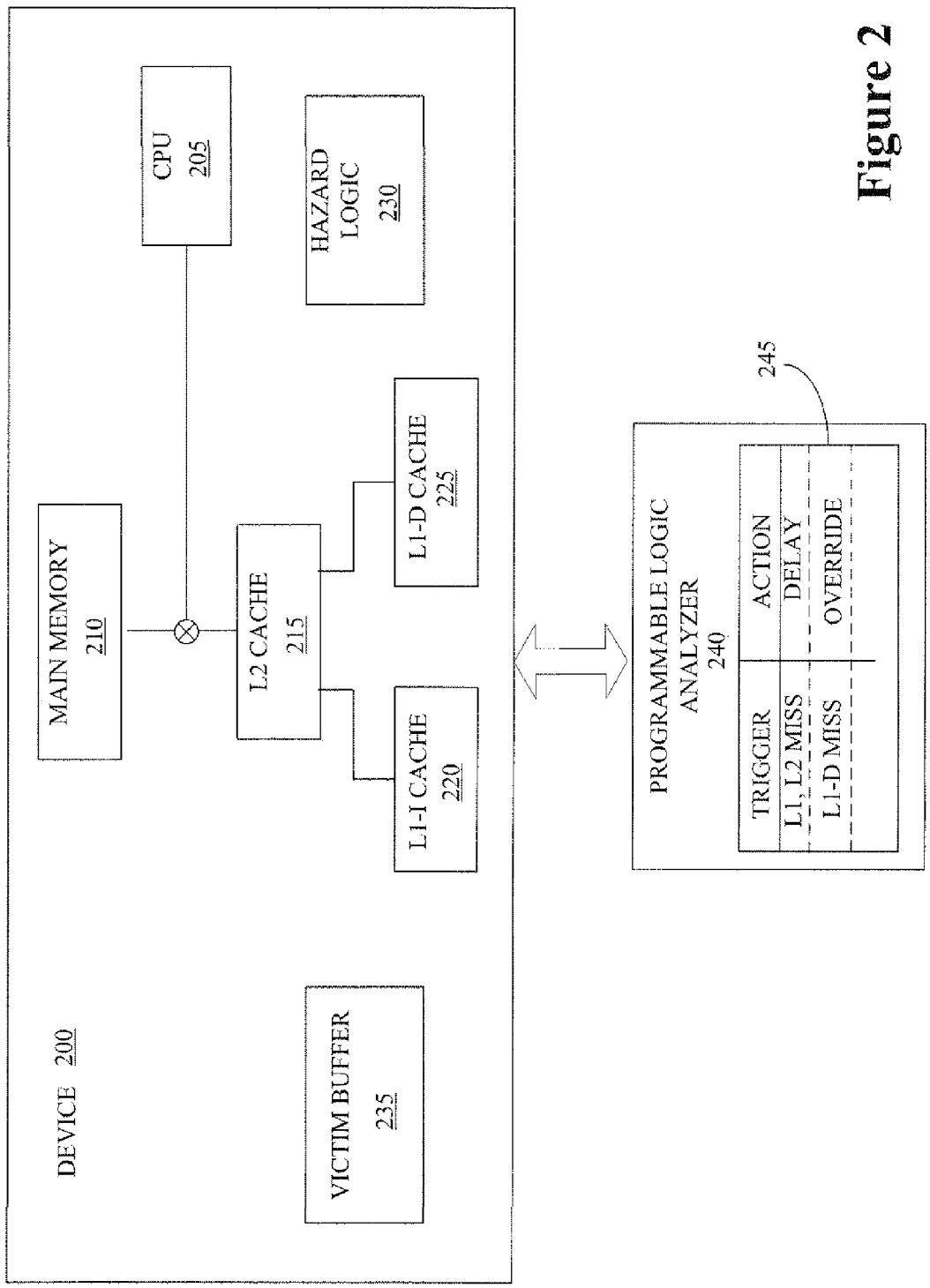
FIG. 2 conceptually illustrates one exemplary embodiment of a semiconductor device that may be formed on a semiconductor wafer.

FIG. 2 conceptually illustrates one exemplary embodiment of a semiconductor device 200 that may be formed on a semiconductor wafer as discussed herein. In the illustrated embodiment, the device 200 includes a central processing unit (CPU) 205 that is configured to access instructions and/or data that are stored in the main memory 210. The device 200 also implements a cache system that is used to speed access to the instructions and/or data by storing selected instructions and/or data in the caches. The illustrated cache system includes a unified level 2 (L2) cache 215 for storing copies of instructions and/or data that are stored in the main memory 210. The illustrated cache system also includes separate level 1 (L1) caches for storing instructions and data, which are referred to as the L1-I cache 220 and the L1-D cache 225. The device 200 also includes hazard logic 230 that is used for resolving conflicts between requests. For example, the hazard logic 230 can detect matching addresses for two cache requests that are in-flight at the same time and to resolve the interference between these requests. One or more victim buffers 235 may also be included to temporarily store copies of information that has been evicted from one or more of the caches 215, 220, 225.

Many if not most of the operations performed by the device 200 involve accessing one or more of the caches 215, 220, 225 to look for instructions and/or data. At least in part because of the "traffic cop" position of the cache in the semiconductor device 200, silicon bugs in the device 200 are often manifested as faults or errors in one or more cache operations. The silicon bugs in the device 200 may be bypassed and/or avoided by manipulating or modifying cache operations such as delaying read or write requests and/or overriding parts of the cache logic. A programmable logic analyzer 240 may therefore monitor caching operations using signal generated by the device 200. The monitored signals can be used to detect onset of silicon bugs and then to identify actions that may avoid and/or bypass the silicon bug to allow the device 200 to continue operation, e.g., to permit continued testing of the device 200 to reveal additional silicon bugs and/or to verify/validate operation of the device 200. In some embodiments, avoiding or bypassing the silicon bug using signals provided by the programmable logic analyzer 240 may be used to facilitate operation of production devices 200 that are sold to customers.

In the illustrated embodiment, the programmable logic analyzer 240 includes a database 245 of trigger conditions that may indicate onset of the silicon bug and actions that may be taken to avoid and/or bypass the silicon bug. For example, the database 245 may indicate that a particular combination of L1 and L2 cache misses may indicate that a silicon bug exists that may cause a fault such as an infinite loop. The database 245 may also indicate that delaying requests to the L1 cache and/or the L2 cache may avoid or bypass the silicon bug conditions that lead to the infinite loop, thereby allowing operation of the device 200 to continue. Thus, when the programmable logic analyzer 240 "sees" that the sequence of events has occurred, it may provide signals to the device 200 that can be used to implement the appropriate delays indicated in the database 245. For another example, the database 245 may indicate that repeated misses to the L1-D cache may indicate a problem with the hazard logic. The database 245 may therefore indicate that overriding the hazard logic may avoid or bypass the silicon bug conditions that led to the repeated misses.

The trigger events/conditions and response actions indicated in the database 245 may be defined by engineers based on various criteria. For example, trigger events and response actions may be defined based on previous experience with other devices indicating that these devices are prone to particular silicon bugs that occur in response to (or in association or correlation with) certain trigger events and that may be avoided/bypassed a particular actions. For another example, the trigger events and response actions may be educated guesses by the engineers based on their understanding of the current design and/or previous designs. When the programmable logic analyzer 240 is used to monitor cache operations, exemplary trigger events can be defined using predetermined performance monitor events and/or combinations thereof. Exemplary actions may include stalling the handling of an L1-I cache miss, stalling the handling of an L1-D cache miss, overriding the victim buffer allocation mechanism, aborting an L1-I cache fill, rejecting an L1-D cache probe, overriding the hazard logic 230 for an L1-D cache miss, overriding the handling of a system probe so it skips its L1 and L2 probe and just responds as a miss, overriding the L1-D cache tag arbiter making the L1-D cache 225 look busy, stalling the handling of combinable writes, and the like.

Figure 3:
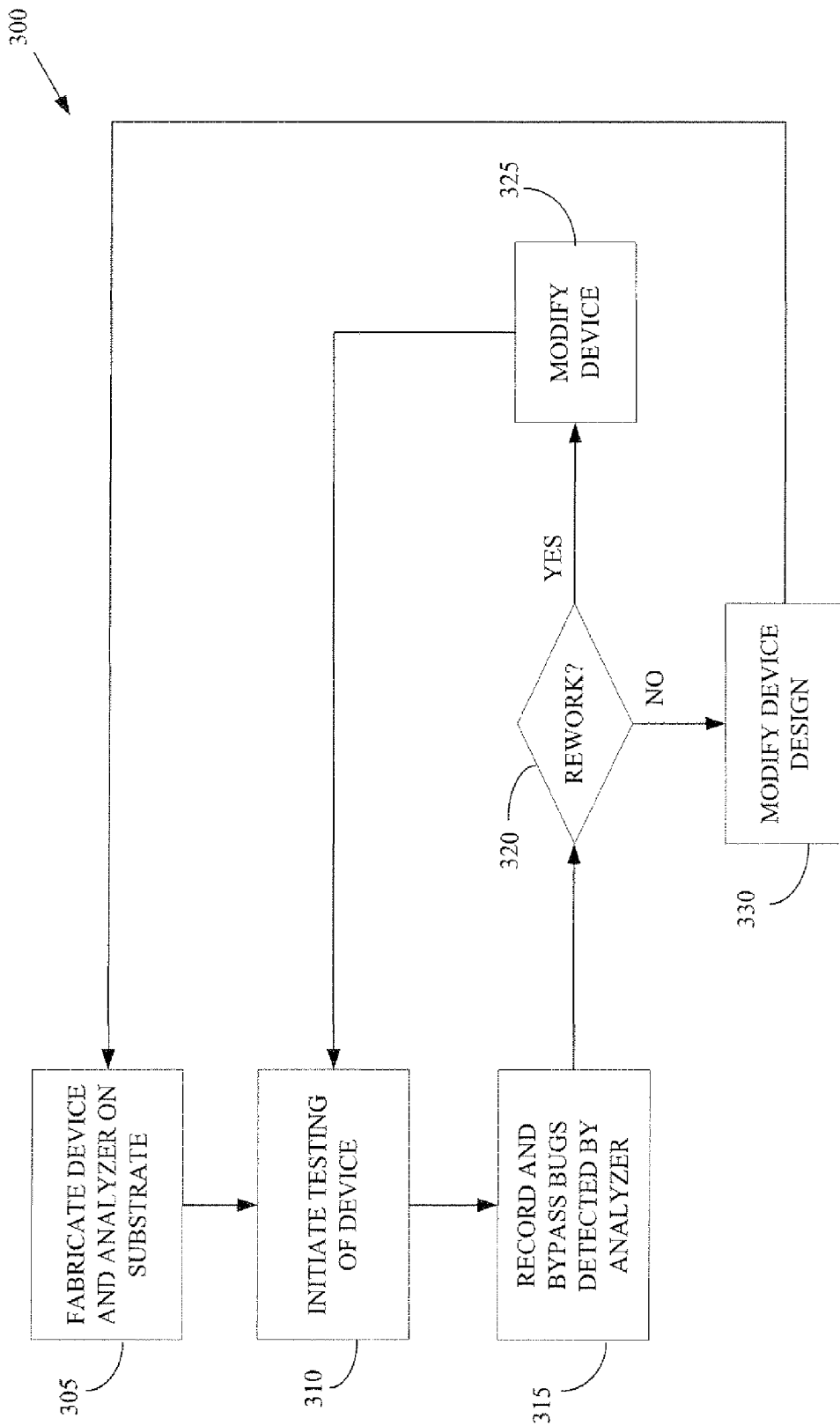
FIG. 3 conceptually illustrates one exemplary embodiment of a method of fabricating and testing a semiconductor device formed on a substrate.

FIG. 3 conceptually illustrates one exemplary embodiment of a method 300 of fabricating and testing a semiconductor device formed on a substrate. In the illustrated embodiment, a semiconductor device and a logic element/analyzer are formed (at 305) on a substrate. The device and the analyzer can be formed concurrently on a substrate or alternatively one may be formed on the substrate before forming the other element. The device and the analyzer formed using conventional semiconductor fabrication processes including deposition, photolithography, etching, filling, polishing, implantation, annealing, and the like. Testing of the device may then be initiated (at 310) and the test results can be monitored by the analyzer. Silicon bugs detected by the analyzer can be recorded (at 315) and the analyzer can take actions to bypass (at 315) some or all of the detected silicon bugs. For example, the detected silicon bugs can be bypassed (at 315) using actions determined by the analyzer and signaled to the semiconductor device.

The system may then decide (at 320) whether to rework portions of the semiconductor device, e.g., using focused ion beam processes and/or one or more additional metal spins. If the semiconductor device is to be reworked, then the physical structure of the device can be modified (at 325) by reworking the device using focused ion beam processes, metal spins, and the like. The substrate may then be returned for additional testing (at 310). If the semiconductor device is not to be reworked, then the device design can be modified (at 330) to correct the silicon bugs that were detected (at 315) by the analyzer. The modified design can be used to fabricate (at 305) the semiconductor device and/or the analyzer on a substrate. The fabrication and testing of the semiconductor device according to method 300 can be iterated until all of the silicon bugs have been detected and corrected or at least until the silicon bug rate has been reduced to an acceptable level. For example, the method 300 may be iterated until the remaining silicon bugs can be avoided or bypassed using software or firmware fixes, such as by taking one or more of the actions defined for the analyzer.

Figure 4:
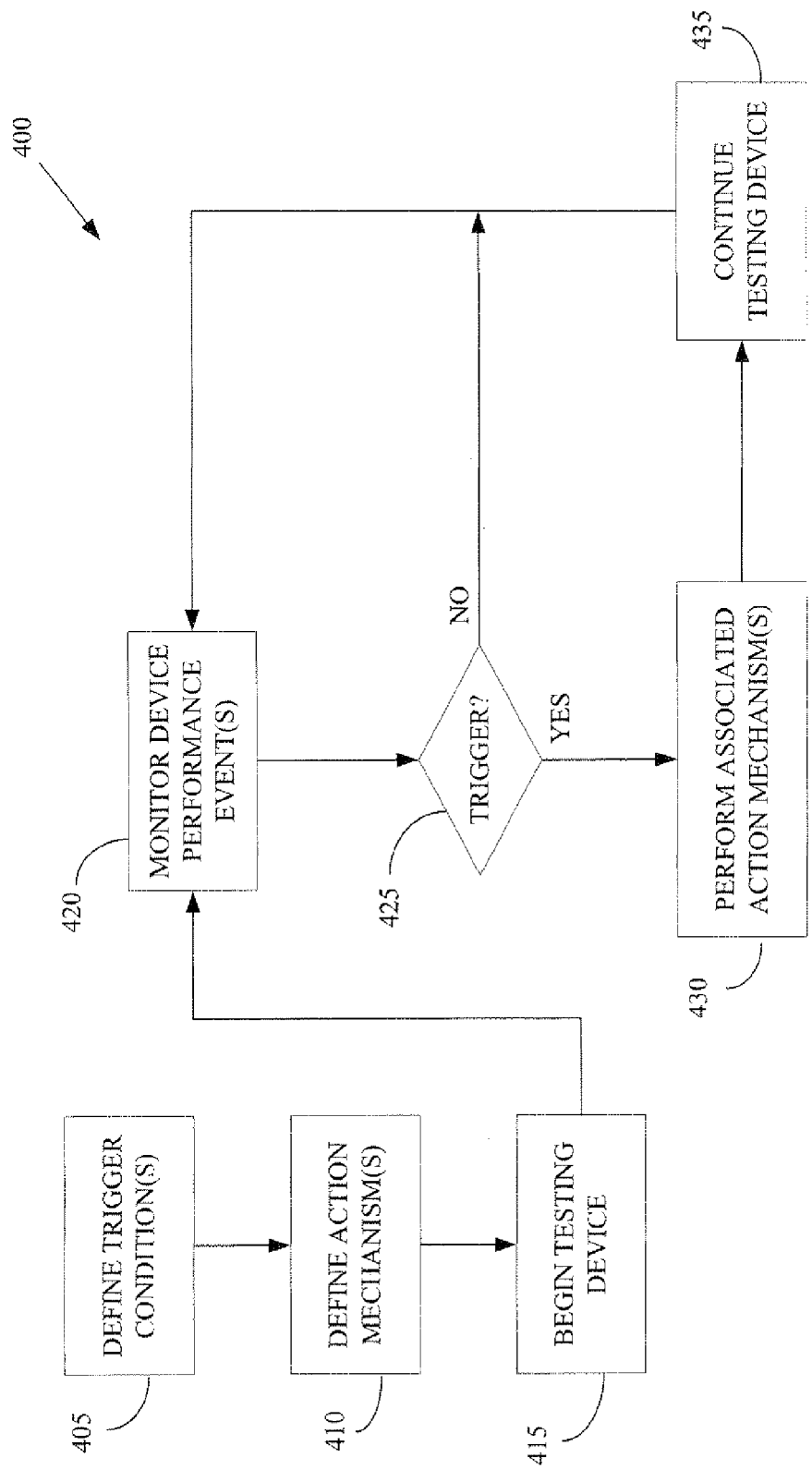
FIG. 4 conceptually illustrates one exemplary embodiment of a method of operating an on-chip programmable logic analyzer.

FIG. 4 conceptually illustrates one exemplary embodiment of a method 400 of operating an on-chip programmable logic analyzer. Examples of analyzers that may be operated according to the method 400 include the logic element 120 depicted in FIG. 1 and the programmable logic analyzer 240 depicted in FIG. 2. In the illustrated embodiment, trigger conditions are defined (at 405) so that the programmable logic analyzer can use these conditions to detect onset of one or more silicon bugs in a semiconductor device. The trigger conditions can be defined (at 405) by engineers and then programmed into the programmable logic analyzer, e.g., as entries into a database. Action mechanisms can be defined (at 410) so that the programmable logic analyzer knows to take these actions in response to one or more of the trigger conditions. For example, engineers can program the action mechanisms into the database and associate the action mechanisms with one or more of the trigger conditions indicated in the database.

When testing of the semiconductor device begins (at 415) the programmable logic analyzer can begin monitoring (at 420) signals from the semiconductor device such as one or more performance events associated with the semiconductor device. The programmable logic analyzer determines (at 425) whether a trigger condition has been detected based on the monitored signals/events. As long as no trigger condition has been detected (at 425), the programmable logic analyzer continues to monitor signals and/or performance events associated with the semiconductor device. When the programmable logic analyzer detects (at 425) a trigger condition, the analyzer performs (at 330) one or more action mechanisms associated with the trigger condition. For example, the programmable logic analyzer may query the database to find the action mechanisms that are associated with a trigger condition and then take the actions that are returned by the database in response to the query. The action mechanism(s) can be signaled to the semiconductor device so that the semiconductor device can avoid and/or bypass the silicon bug indicated by the trigger condition. Testing and/or operation of the semiconductor device can then continue (at 435). The programmable logic analyzer also continues to monitor (at 420) signals from the semiconductor device.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. A method, comprising:
   detecting, using a logic element formed on a substrate, a predefined trigger condition indicating onset of a functional bug during operation of a semiconductor device formed on the substrate; and
   modifying, using the logic element, operation of the semiconductor device to avoid onset of the functional bug by taking a predefined action associated with the predefined trigger condition.

2. The method of claim 1, wherein detecting a predefined trigger condition comprises detecting the predefined trigger condition during a testing procedure for the semiconductor device, and wherein modifying operation of the semiconductor device comprises modifying operation of the semiconductor device to bypass the functional bug to allow the testing procedure to uncover at least one subsequent functional bug.

3. The method of claim 1, wherein the semiconductor device comprises at least one cache formed on a substrate and wherein detecting the predefined trigger condition comprises detecting the predefined trigger condition using performance monitor events for said at least one cache.

4. The method of claim 3, wherein detecting a predefined trigger condition using performance monitor events comprises detecting at least one of a cache hit or a cache miss.

5. The method of claim 3, wherein modifying operation of said at least one cache by taking a predefined action comprises at least one of delaying a cache operation or overriding caching logic associated with said at least one cache.

6. The method of claim 5, wherein delaying the cache operation comprises at least one of stalling the handling of a cache miss, aborting a cache fill, rejecting a cache probe, or stalling the handling of a combinable write.

7. The method of claim 5, wherein overriding the caching logic comprises at least one of overriding a victim buffer allocation mechanism, overriding hazard logic for a cache miss, overriding handling of a system probe, or overriding a cache tag arbiter.

8. An apparatus, comprising:
   a semiconductor device formed on a substrate; and
   a logic element formed on the substrate, the logic element being configured to detect a predefined trigger condition indicating onset of a functional bug during operation of the semiconductor device and modify operation of the semiconductor device to avoid onset of the functional bug by taking a predefined action associated with the predefined trigger condition.

9. The apparatus of claim 8, wherein the substrate comprises a silicon substrate and wherein the semiconductor device is formed on the substrate concurrently with the logic element.

10. The apparatus of claim 8, wherein the semiconductor device is configured to receive testing signals and to generate output signals in response to the testing signals, and wherein the logic element is configured to detect the predefined trigger condition using the output signals from the semiconductor device.

11. The apparatus of claim 10, wherein the logic element is configured to generate control signals in response to detecting the predefined condition, and wherein the semiconductor device is configured to modify its operation based on the control signals.

12. The apparatus of claim 8, wherein the semiconductor device comprises at least one cache.

13. The apparatus of claim 12, wherein the logic element is configured to cause at least one of a delay in a cache operation for said at least one cache or an override of caching logic associated with said at least one cache.

14. The apparatus of claim 13, wherein delaying the cache operation comprises at least one of stalling the handling of a cache miss, aborting a cache fill, rejecting a cache probe, or stalling the handling of a combinable write.

15. The apparatus of claim 13, wherein overriding the caching logic comprises at least one of overriding a victim buffer allocation mechanism, overriding hazard logic for a cache miss, overriding handling of a system probe, or overriding a cache tag arbiter.

16. A method of debugging a semiconductor device formed on a substrate, comprising:
   supplying testing signals to the semiconductor device;
   detecting, using a logic element formed on the substrate, a predefined trigger condition indicating onset of a functional bug using output signals generated by the semiconductor device in response to the testing signals; and
   modifying, using the logic element, operation of the semiconductor device to avoid onset of the functional bug by taking a predefined action associated with the predefined trigger condition.

17. The method of claim 16, wherein detecting the predefined trigger condition comprises detecting a predefined trigger condition that indicates onset of a functional bug that can be corrected by modifying the physical structure of the semiconductor device.

18. The method of claim 16, wherein detecting the predefined trigger condition comprises detecting a predefined trigger condition that indicates onset of a functional bug that interferes with operation of the semiconductor device so that additional testing cannot be performed.

19. The method of claim 18, wherein modifying operation of the semiconductor device comprises modifying operation of the semiconductor device to bypass the functional bug so that additional testing can be performed.

20. The method of claim 19, comprising supplying additional testing signals to the semiconductor device concurrently with or after bypassing onset of the functional bug by taking the predefined action.

* * * * *